(12) United States Patent
Kucharczyk

(10) Patent No.: US 6,460,770 B1
(45) Date of Patent: Oct. 8, 2002

(54) BIDIRECTIONAL BARCODE SCANNING SYSTEM

(75) Inventor: David Kucharczyk, Santa Fe, NM (US)

(73) Assignee: Atlantes Services, Inc., Menlo Park, CA (US)

( * ) Notice: Subject to any disclaimer, the term of this patent is extended or adjusted under 35 U.S.C. 154(b) by 115 days.

(21) Appl. No.: 09/599,034

(22) Filed: Jun. 21, 2000

(51) Int. Cl.[7] ................................................ G06K 7/10
(52) U.S. Cl. ........................... 235/472.02; 235/462.25; 235/462.01
(58) Field of Search ................................. 235/472, 462, 235/454, 494, 468

(56) References Cited

U.S. PATENT DOCUMENTS

| | | | | |
|---|---|---|---|---|
| 4,939,356 A | * | 7/1990 | Rando et al. ............... | 235/467 |
| 5,157,687 A | * | 10/1992 | Tymes ......................... | 375/1 |
| 5,698,834 A | * | 12/1997 | Worthington et al. ...... | 235/472 |
| 5,723,854 A | | 3/1998 | Berney | |
| 5,825,045 A | | 10/1998 | Koenck et al. | |
| 5,920,059 A | * | 7/1999 | Barile et al. ............. | 235/462.07 |
| 5,992,747 A | * | 11/1999 | Katoh et al. ............ | 235/462.43 |
| 6,010,071 A | * | 1/2000 | Bard et al. ............. | 235/462.43 |
| 6,058,304 A | | 5/2000 | Callaghan et al. | |
| 6,123,264 A | * | 9/2000 | Li et al. ................. | 235/472.01 |
| 6,142,379 A | * | 11/2000 | Bard et al. ............. | 235/472.01 |
| 6,237,850 B1 | * | 5/2001 | Kito ....................... | 235/462.08 |

FOREIGN PATENT DOCUMENTS

| | | |
|---|---|---|
| EP | 0 389 125 A2 | 9/1990 |
| EP | 0 918 416 A2 | 5/1999 |
| JP | 361094181 * | 5/1986 |

OTHER PUBLICATIONS

International Search Report—PCT/01/20042—Jan. 3, 2002.

* cited by examiner

Primary Examiner—Thien M. Le
(74) Attorney, Agent, or Firm—Blakely Sokoloff Taylor & Zafman LLP

(57) ABSTRACT

A bidirectional barcode scanning device that retains the same functionality in terms of reading information encoded on a barcode label as a conventional barcode scanner but that is also able to transmit information through a barcode label to a receiving device. The barcode label is affixed to a transparent substrate so that light from the barcode scanning device may be transmitted through the barcode and the transparent substrate to the receiving device. The light from the barcode scanning device contains an information signal that is decoded by the barcode label receiving device.

19 Claims, 4 Drawing Sheets

REFLECTED SIGNAL INTENSITY

WITH 100% MODULATION

BIDIRECTIONAL BARCODE SCANNING SYSTEM

FIELD OF THE INVENTION

The present invention relates generally to barcode scanners and, more particularly, to a barcode scanning system capable of both receiving and transmitting information.

BACKGROUND

Numerous optical scanners have been developed for tracking and maintaining information by reading barcode symbols appearing on a label or the surface of an article. The typical one-dimensional (1-D) barcode symbol is a coded pattern of indicia comprised of rectangular shaped bars of various widths spaced apart from one another. The bars and spaces have different light-reflecting characteristics and are used to represent desired information (e.g., price, identity, etc.) regarding an item. A two-dimensional (2-D) barcode provides more complex lines and spaces in two orthogonal axes and represents even more information regarding an item than is represented by 1-D barcodes.

Various systems exist to read barcodes, including handheld wands, portable laser scanners, and stationary optical reading systems. These systems electro-optically convert the graphical data on the barcode into electrical signals, which are then transformed to alpha-numeric characters to decode the information represented therein. Such characters are generally multiple digit representations and have typically been used as an input to a data processing system for applications in tracking, checkout or sales purposes, fixed asset inventory control, and the like. For instance, parcel delivery companies such as Federal Express and the United Parcel Service (UPS) make large use of barcode scanners. These organizations ship millions of parcels every day. A personal tracking number is usually assigned to each parcel. Barcode scanners are utilized to keep track of an individual parcel (which has a barcode label attached) as it progresses through the delivery process.

One limitation of scanning systems of the past, however, is that they are only capable of receiving information. That is, to date barcode scanners and the like have only been used to read information encoded on barcode labels.

SUMMARY OF THE INVENTION

One embodiment of the present invention provides an improved barcode scanning device that retains the same functionality as a normal barcode scanner in terms of reading information on a barcode label but that is also able to transmit information through a barcode to a receiving device connected to a central processing unit (CPU).

According to one aspect of the present invention, there is provided a conventional barcode symbol reading apparatus comprising a photo-emitter, such as a laser diode, and mechanical scanning means such as a rotating mirror for producing a scan line of light along a barcode. In a departure from barcode scanners of the past, however, the present barcode symbol reading apparatus may also include input means for receiving an information signal, an oscillator to produce a carrier signal, and a modulator to modulate the information signal on the carrier signal at a defined frequency. A laser diode in the barcode symbol reading apparatus converts the modulated electrical signal to a light signal, which may then pass through a lens, through the barcode, and to a receiving device connected to a CPU.

In addition to transmitting the modulated information signal through the barcode to the receiving device, the barcode symbol reading apparatus may also read the information encoded on the barcode by illuminating the coded surface and detecting the variations in contrasts of the bars and spaces. Light reflected from the barcode may be collected with a photodetector in a receiving portion of the barcode symbol reading apparatus to produce signals which are amplified and supplied to a low-pass filter. The low-pass filter removes the higher-frequency components of the reflected light signal, such as the information signal. Electronic decoding means may be arranged to receive the low-pass filtered reflected beam and to recover from this portion of the reflected signal the information which was encoded within the indicia on the barcode.

The barcode itself comprises a scannable area of parallel bars and spaces in a manner well known in the art. The barcode may be affixed to one side of a light pipe, such that when the light signal from the barcode symbol reading apparatus illuminates the surface of the barcode, light from the barcode symbol reading apparatus is transported through the light pipe. A sensor coupled to the other end of the light pipe detects the presence of this light. The light, including the modulated information signal and also the lower frequency modulation signal produced by the different levels of translucency of the barcode itself are converted by a sensor to an analog electrical signal which may be supplied to an amplifier and then filtered to remove the low frequency modulation.

In one embodiment of the present invention, the amplifier may supply the electrical signal to a high-pass filter which removes the lower frequency signal modulation. The remaining information signal may then be supplied to an asynchronous decoder in the receiving device, which signal may be converted into framed data and subsequently supplied to a central processing unit (and/or stored in memory).

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Throughout the following description specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

One limitation of scanning systems of the past is that, to date, barcode scanners and the like have only been used to read information encoded on barcode labels. It would be helpful if barcode scanners could also transmit information. One application in which this would be useful is if barcode scanners functioned as electronic keys, such as by transmitting electronic signals through a barcode label to a receiving device. In one model, a Federal Express agent could deliver a package to a residence or business after hours and use a barcode scanning device to provide the proper code to a unlock a storage box or other areas for receiving deliveries (e.g., a mail room door) and deliver the parcel. The barcode scanning device in this instance could also transmit a digital signature to the storage box, etc., through a transparent or semi-transparent barcode label to a central processing unit (CPU) associated with the storage box, such as a digital signature verifying the date and time of the delivery and/or the identity of the person/company making the delivery.

A barcode device that could both receive and transmit information would be useful in numerous other applications as well.

Figure 1:
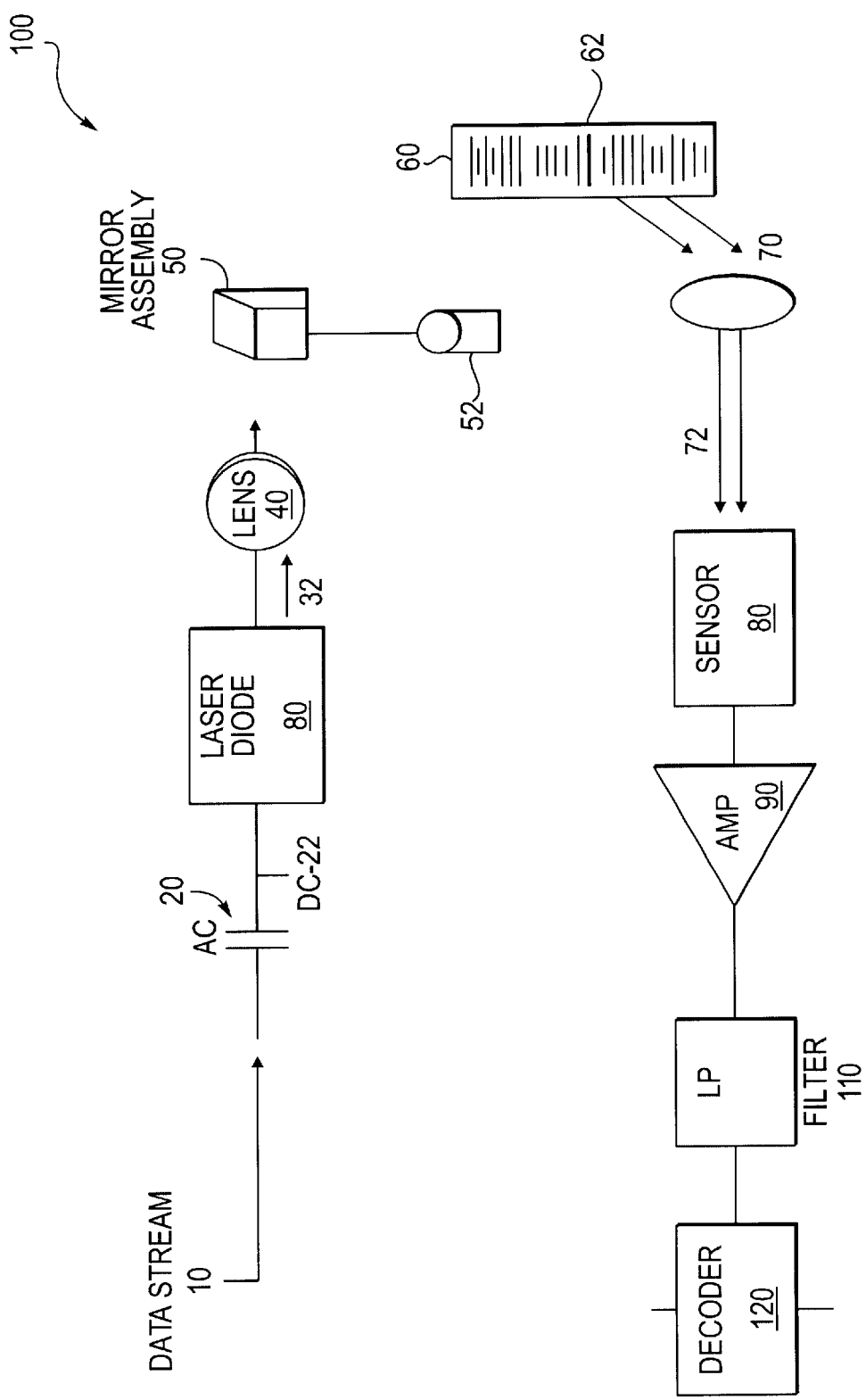
FIG. 1 is a functional block diagram illustrating the overall operation of a barcode symbol reading apparatus constructed according to one embodiment of the present invention.

Referring now to FIG. 1, there is shown a functional block diagram illustrating the overall operation of a barcode symbol reading apparatus 100 constructed in accordance with one embodiment of the present invention. In particular, the barcode symbol reading apparatus 100 includes a light emitter in the form of a conventional laser diode 30 for emitting a light beam 32 directed toward a substrate 60 containing a barcode 62. Other types of photo emitters such as LEDs may be used as well, although in one embodiment of the present invention the light source is a laser diode 30. A conventional spinner 52 is disposed in optical alignment with the laser diode 30 and includes a mirror assembly 50 suitably mounted thereto for reflecting the light beam 32 in a predetermined manner. An optional focusing lens 40 is optically aligned between the laser diode 30 and the mirror assembly 50 for focusing the light beam 32 onto the barcode 62.

In a departure from conventional barcode scanners, the barcode symbol reading apparatus 100 of the present invention may also include input means for receiving an information signal 10 and transmitting means for transmitting the information signal 10 through the barcode 62. The barcode symbol reading apparatus 100 may also include an oscillator (not shown in this view) to produce a carrier signal (e.g., the DC signal 22). The information signal is modulated onto the carrier using an alternating current (AC) coupling device 20 (e.g., a capacitor) to superimpose the information signal 10 onto the amplitude of the carrier signal 22. The AC coupling device 20 provides coupling onto the carrier signal 22 and also eliminates any steady state components of the information signal 10. The carrier signal 22 and the information signal 10 are then provided to the laser diode 30 to produce the light signal 32 discussed above. Of course, this is not the only method that may be used to provide an information signal 10. For example, in another embodiment of the present invention, the information signal 10 may be used to modulate the frequency of the carrier signal 22. Regardless of the modulation technique used, however, the light signal 32 emitted by the laser diode 30 may be projected through the barcode 62 to a barcode label receiving device (not shown in this view) and, ultimately, to a CPU (not shown in this view).

In addition to transmitting the modulated carrier signal 22 through the barcode 62 to a barcode label receiving device, the barcode symbol reading apparatus 100 may also read the information encoded on the barcode 62. In operation, the light signal 32 emitted by the laser diode 30 illuminates the barcode 62. As the barcode symbol reading apparatus 100 is scanned over the coded surface of the barcode 62, the light signal 32 from the laser diode 30 is incident to the marks and spaces of the barcode 62 thereon and is differentially absorbed by the variable reflectivity indicia thereof. The differentially absorbed light is reflected off the barcode 62 directly to a focusing lens 70 in optical alignment with a focal point of a photodetector (or other sensor) 80 in the receiving portion of the barcode symbol reading apparatus 100. The photodetector 80 responds to the changing intensity of the reflected light beam 32 and transforms the optical signal into an electrical signal, generating a series of pulses that are consistent with the pattern of the light reflected off the barcode 62 as the barcode symbol reading apparatus 100 scans the indicia on the barcode 62. An amplifier 90 connected to the output of the photodetector 80 amplifies this signal, and the amplified signal may, in turn, be fed to a low-pass filter 110 which filters out the unnecessary high-frequency components of the signal (e.g., the information signal 10). A decoder 120 then decodes the received signal into data characters that are descriptive of the information encoded on the barcode 62.

Figure 2A:
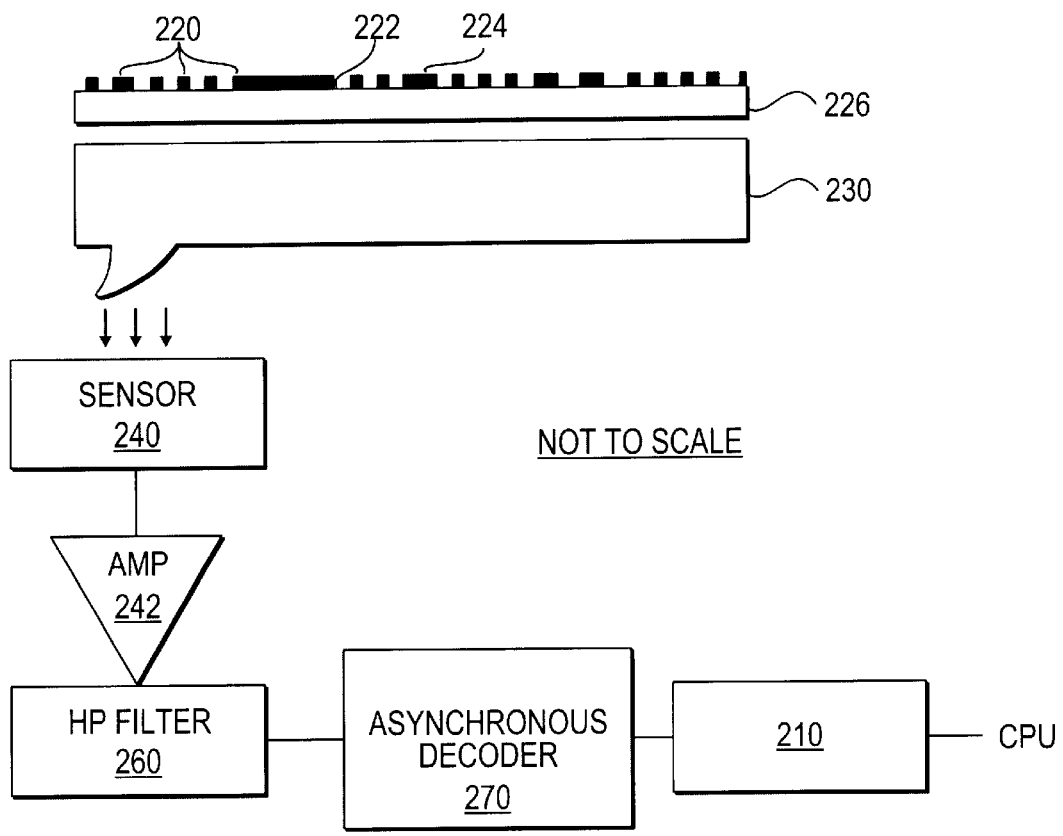
FIG. 2A is a block diagram of one embodiment of a barcode label receiving device configured in accordance with the present invention.

Referring now to FIG. 2A, there is shown a block diagram of a barcode label receiving device 200 connected by circuitry to a CPU 210 in accordance with one embodiment of the present invention. The barcode 220 itself may be specular material comprised of a plurality of white barcode elements 222 and black barcode elements 224 encoded with data in a manner well known in the art. The data on the barcode 220 is defined by the ratio of the width of the white barcode elements 222 to the black barcode elements 224 and also by the order of the white and black elements 222 and 224 as they are arranged on the barcode 220. The barcode 220 may be affixed to one side of a transparent (or semi-transparent) substrate 226. A light pipe 230 is affixed with glue or some other type of adhesive to the other side of the transparent substrate 226. Typically, the light pipe 230 may be made from optically-transparent material such as polished plastic, but it could be made from other materials as well. The light pipe 230 is positioned in the barcode label receiving device 200 in such a way that when the light signal from the barcode symbol reading apparatus (not shown in this view) illuminates the surface of the barcode 220, light from the barcode symbol reading apparatus is transported through the spaces between the black elements 222 and at lower intensity through the black elements 224 (or other color elements) of the barcode 220 and the transparent substrate 226 to the light pipe 230. The light transmitted from the barcode symbol reading apparatus through the barcode 220 contains the modulated information signal. The modulated signal must be transmitted at a high enough frequency such that the intensity flicker caused by the beam moving over the barcode can be filtered out without distorting or aliasing the modulated signal. The minimum frequency of the modulation of the information signal is determined by the following formula:

$$\frac{\text{Scan speed (in/sec)}}{2 \times \text{minimum line width (inches)}} \times 10 = \frac{\text{minimum modulation}}{\text{sideband component } f \text{ (H}_z)}$$

This formula is a guideline only. Filter shape of receiving mechanism will determine actual minimums in an application.

Other methods may be used to transmit the modulated information signal through the barcode 220 to the barcode label receiving device 200. For instance, in another embodiment of the present invention, the light may be transmitted through the barcode by temporarily stopping the beam scanning at the edge of the barcode 200 and then transmitting the modulated data. Also, CCD type scanners could use the same principle of a "data area" at the edge of the barcode 200 or through the barcode without filtering since the passed through light is held at a constant level.

Once the light is transmitted through the barcode 220 and the transparent substrate 226, the light is redirected by the light pipe 230 to a sensor 240 (e.g., a photodiode) in the barcode label receiving device 200. The sensor 240 is adapted to convert the received light pulses to an analog electrical signal which may then be supplied to an amplifier 242 in the receiving device 200.

In the embodiment of the invention represented in FIG. 2, the amplifier 242 supplies the electrical signal to a high-pass filter 260, which removes the lower frequency components of the signal (e.g., the pulses that are generated as the light signal from the barcode symbol reading apparatus scans across the barcode 200). The remaining information signal is supplied to an asynchronous decoder 270 and thereby converted into framed data and supplied to a CPU 210 and/or to a data storage unit such as a memory.

Figure 2B:
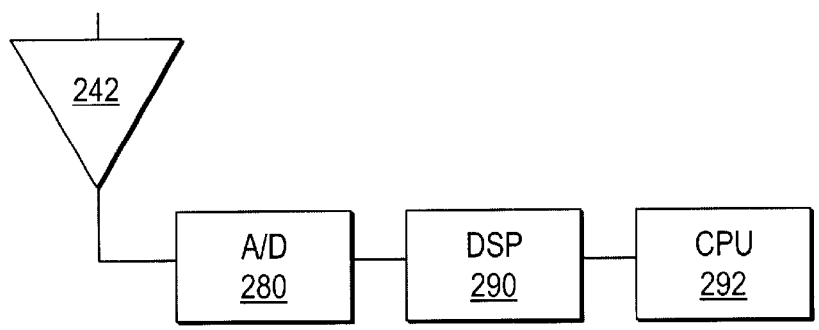
FIG. 2B is a block diagram of an alternative embodiment of the barcode label receiving device.

In another embodiment of the barcode label receiving device as shown in FIG. 2B, instead of a high-pass filter 260 receiving the signal from the amplifier 242, the amplified signal is instead supplied to an analog-to-digital converter 280 which digitizes the signal into numerical values in a manner well known in the art. The output of the analog-to-digital converter 280 is then supplied to a digital signal processor (DSP) 290 which filters the numerical values and decodes them according to a mathematical function rather than using an analog high-pass filter 260 and an asynchronous decoder 270. The DSP 290 then supplies this information to a CPU 292 and/or a memory.

Figure 2C:
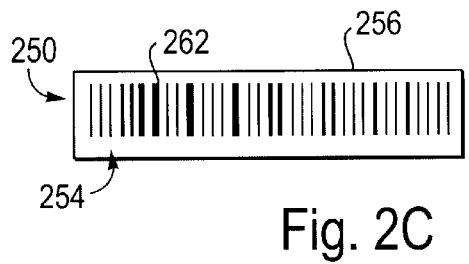
FIG. 2C is a top view of a barcode label affixed to a transparent substrate.

FIG. 2C is a top view of the barcode label receiving device 250. The black elements 252 and the white elements 254 comprise the barcode and are affixed to one side of the transparent or semi-transparent substrate 256.

Figure 3:
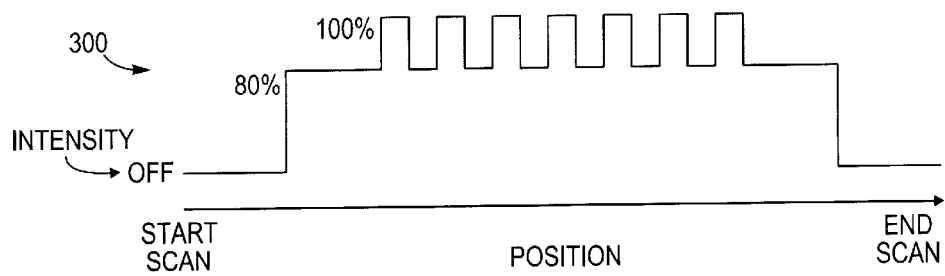
FIG. 3 is a graphical view of a modulated light signal according to one embodiment of the present invention.

FIG. 3 is a graphical view of the modulated light signal 300 according to one embodiment of the present invention wherein the information signal modulates a carrier using intensity modulation. The modulated light signal 300 is transmitted through the barcode (not shown in this view) to the barcode label receiving device (not shown in this view) while simultaneously reflecting off of the barcode. The modulated light signal 300 is shown at zero intensity as the barcode symbol reading apparatus (not shown in this view) starts the scan of the barcode, 80% and 100% intensity (according to the modulation pattern of the information signal) as the barcode symbol reading apparatus continues the scan of the barcode, and zero intensity as the barcode symbol reading apparatus ends the scan of the barcode.

Figure 4:
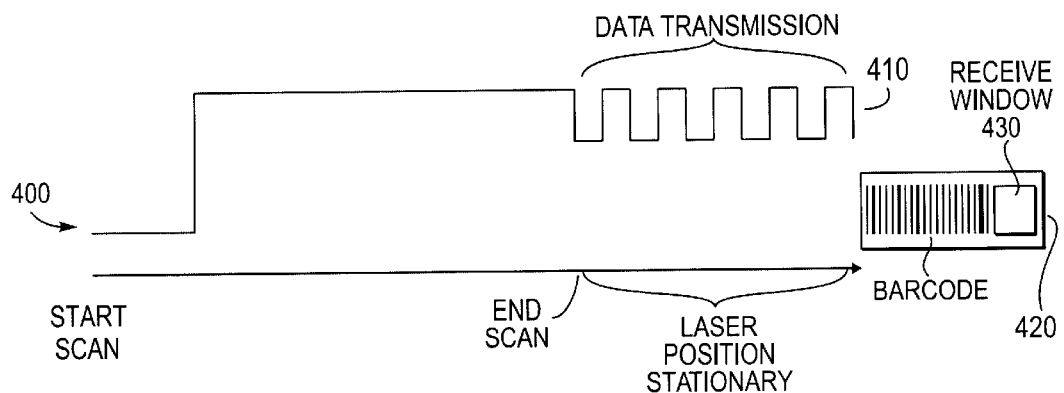
FIG. 4 is a graphical view of a modulated light signal according to a further embodiment of the present invention. In this view, the modulated information signal is transmitted to the barcode label receiving device while the barcode symbol reading apparatus is stationary at the edge of the barcode.

FIG. 4 is a graphical view of a modulated light signal 400. In this embodiment, the barcode symbol reading apparatus (not shown in this view) transmits the information signal 410 while the beam is stationary at the edge of the barcode 420. The barcode symbol reading apparatus first scans the barcode 420 and then transmits the modulated information signal 410 through a receive window 430 to the barcode label receiving device (not shown in this view).

Figure 4A:
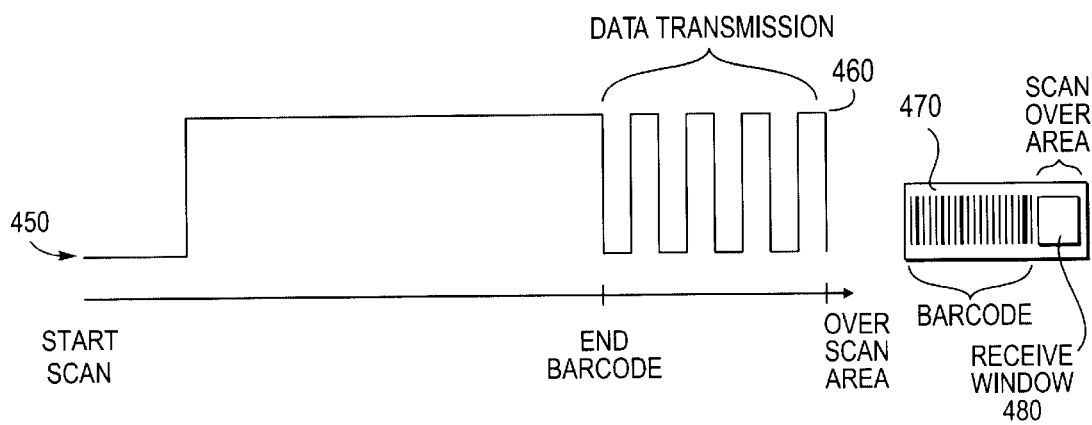
FIG. 4A is a modified version of FIG. 4. In this view, the scan continues past the barcode and the modulated information signal is transmitted to the barcode label receiving device while the barcode symbol reading apparatus scans a translucent area at the edge of the barcode.

FIG. 4A is a modified version 450 of FIG. 4. In this embodiment, the barcode symbol reading apparatus (not shown in this view) transmits the information signal 460 after the beam passes the printed part of the barcode 470 and passes over the receive window 480 at the start or end of the barcode 470. The information signal 460 is transmitted to the barcode label receiving device (not shown in this view) as the beam is moving over the receive window 480.1

Figure 5:
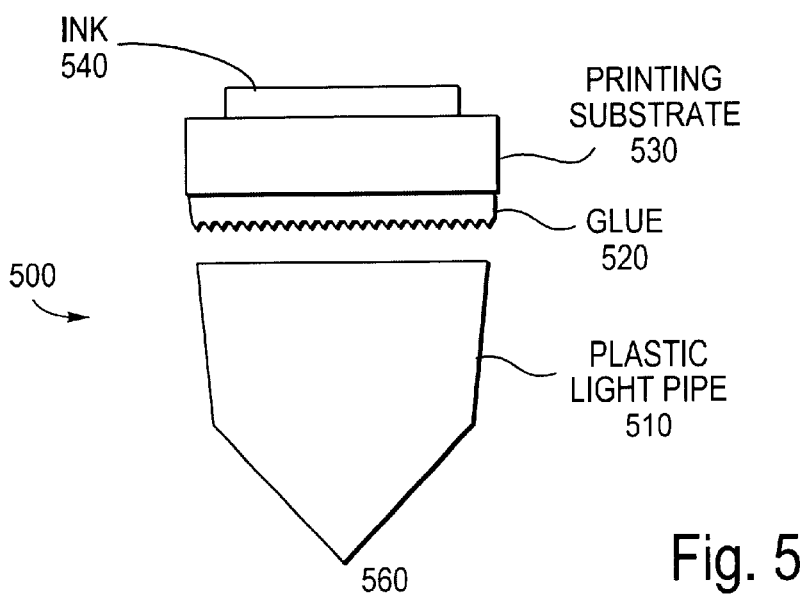
FIG. 5 is a side view of the barcode as it is affixed to the transparent substrate and the light pipe in the barcode label receiving device.

FIG. 5 is a side view of a portion of the barcode label receiving device 500. The plastic light pipe 510 is affixed to one side of the transparent substrate 530 with glue 520 or another type of adhesive. The light pipe 510 redirects the light received from the barcode symbol reading apparatus (not shown in this view) as it is transmitted through the barcode 540 and the transparent substrate 530 to a focused point 560 in the light pipe 510. The black and white elements of the barcode indicia 540 are fabricated from ink and are affixed to the other side of the transparent substrate 530.

Figure 6:
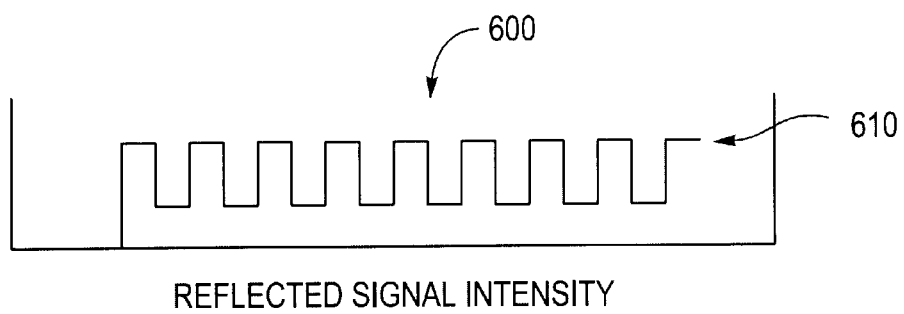
FIG. 6 is a graphical view of reflected light intensity generated in a light beam as a conventional barcode scanner is scanned over the surface of a barcode.

FIG. 6 is a graphical view of the pulses generated in a light signal 600 as a conventional barcode scanner is scanned over the surface of a barcode (not shown in this view). The light beam 610 is differentially absorbed by the variable reflectivity indicia on the barcode, which generates a series of pulses in the light beam.

Figure 7:
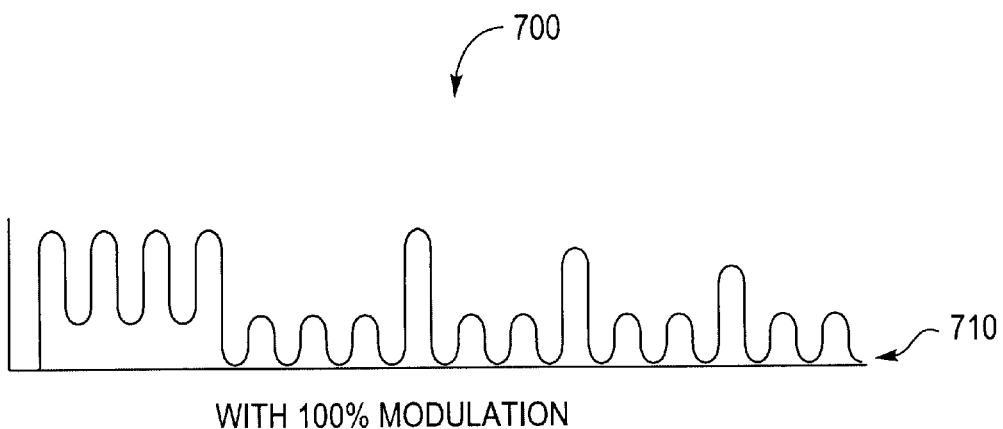
FIG. 7 is a graphical view of reflected light intensity of a light signal that includes a modulated information signal as the barcode symbol reading apparatus scans a barcode.

FIG. 7 is a graphical view of the pulses generated in a light signal 700 (which is made up of the combination of the modulated information signal and the carrier. The pulses are generated in the light signal 710 as the barcode symbol reading apparatus scans the indicia on the barcode). In one embodiment of the present invention, a high-pass filter in the barcode label receiving device (not shown in this view) filters out the lower frequency pulses generated as the light beam from the barcode symbol reading apparatus scans the indicia on the barcode, leaving only the information signal as discussed above.

Thus, a bidirectional barcode symbol reading apparatus has been described. Although the foregoing description and accompanying figures discuss and illustrate specific embodiments, it should be appreciated that the present invention is to be measured only in terms of the claims that follow.

What is claimed is:

1. A bidirectional barcode scanning system, comprising:

a transmitter;

a receiver;

an input terminal coupled to the transmitter, the input terminal configured to receive an information signal to be transmitted in a light beam;

a scanner coupled to the transmitter, the scanner configured to scan the light beam across coded symbology on at least a portion of a substrate to reflect the light beam back to the receiver; and a decoder coupled to the receiver, the decoder configured to decode the symbology contained in the reflected light beam.

2. The bidirectional barcode scanning system of claim 1, wherein the transmitter includes a light emitter for emitting the light beam and a lens in optical alignment with the light emitter, the lens configured to focus the light beam across the coded symbology.

3. The bidirectional barcode scanning system of claim 2, wherein a rotating mirror is in optical alignment with the light emitter and the lens and rotates to scan the light beam across the coded symbology to reflect the light back to the receiver.

4. The bidirectional barcode scanning system of claim 3 wherein the input terminal comprises an oscillator to produce a carrier signal and a modulator to modulate the information signal and the carrier signal.

5. The bidirectional barcode scanning system of claim 4, wherein the input terminal transmits the modulated signal to the light emitter as an electrical signal, the light emitter converting the electrical signal to an optical signal which is emitted from the light emitter as the light beam.

6. The bidirectional barcode scanning system of claim 5, wherein as the rotating mirror scans the light beam across the coded symbology reflecting the light back to the receiver, a photo detector in the receiver receives the light beam reflected from the coded symbology and produces pulses corresponding to the symbology.

7. The bidirectional barcode scanning system of claim 6 wherein the reflected light beam also contains the information signal received by the input terminal, the photo detector producing pulses corresponding to the information signal.

8. The bidirectional barcode scanning system of claim 7 wherein the photo detector transmits the pulses to a low-pass filter in the receiver, the low-pass filter filtering the pulses generated from the information signal and transmitting to the decoder the pulses corresponding to the symbology.

9. The bidirectional barcode scanning system in claim 8, wherein the decoder transforms the pulses transmitted by the low-pass filter to an electrical signal and decodes the symbology contained therein.

10. A barcode label receiving device, comprising:

a transparent substrate;

coded symbology affixed to the substrate; and a receiving device coupled to the substrate.

11. The barcode label receiving device of claim 10 wherein the barcode label receiving device further comprises a light pipe affixed to one side of the transparent substrate and a sensor coupled to the light pipe, the light pipe configured to redirect a light beam transmitted through the substrate and to transmit the light beam to the sensor.

12. The barcode label receiving device of claim 11 wherein the light beam transmitted through the substrate and redirected by the light pipe to the sensor contains a modulated information signal and a lower-level signal corresponding to the coded symbology affixed to the substrate, the sensor converting the modulated information signal and the lower-level signal to an electrical signal and transmitting the electrical signal to a high-pass filter electronically connected to the sensor.

13. The barcode label receiving device of claim 12 wherein the high-pass filter filters the lower-level signal and transmits the modulated information signal to an asynchronous decoder, the asynchronous decoder electronically connected to the high-pass filter.

14. The barcode label receiving device of claim 13 wherein the asynchronous decoder converts the modulated information signal to framed data and transmits the framed data to a data storage or data processing unit, the data storage or data processing unit electronically connected to the asynchronous decoder.

15. A barcode label receiving device, comprising:

a transparent substrate;

coded symbology affixed to the substrate;

a receiving device coupled to the substrate;

an analog-to-digital converter coupled to the receiving device; and a digital signal processor coupled to the analog-to-digital converter.

16. The barcode label receiving device of claim 15 wherein a light pipe is affixed to one side of the transparent substrate, the light pipe configured to redirect a light beam transmitted through the substrate and to transmit the light beam to a sensor, the sensor coupled to the light pipe.

17. The barcode label receiving device of claim 16 wherein the light beam transmitted through the substrate and redirected by the light pipe to the sensor contains a modulated information signal and a lower-level signal corresponding to the coded symbology affixed to the substrate, the sensor converting the modulated information signal and the lower-level signal to an electrical signal and transmitting the electrical signal to the analog-to-digital converter, the analog-to-digital converter converting the electrical signal into numerical values.

18. The barcode label receiving device of claim 17 wherein the analog-to-digital converter transmits the numerical values to the digital signal processor, the digital signal processor filtering the numerical values corresponding to the modulated information signal from the numerical values corresponding to the lower level signal.

19. The barcode label receiving device of claim 18 wherein the digital signal processor decodes the numerical values corresponding to the modulated information signal and transmits this information to a data storage or data processing unit.

* * * * *